United States Patent Office 3,085,038
Patented Apr. 9, 1963

3,085,038
PRODUCTION OF CELLULOSE FURFURAL AND FODDER FROM AGRICULTURAL WASTE
Paolo Rovesti, Milan, Italy, assignor to Research and Mechanical Applications S.p.A.-R.A.M.A., Milan, Italy, a company of Italy
No Drawing. Filed Oct. 13, 1959, Ser. No. 846,065
Claims priority, application Italy Oct. 15, 1958
1 Claim. (Cl. 162—16)

There are known processes for the extraction of furfural from agricultural waste such as olive husk, oat husk or rice husk, maize stalks and husks, almond shells, sugar cane bagasse etc. All those processes aim at the sole object of obtaining furfural and are based upon acid digestion of the raw material employed, without caring as to any possible further uses thereof. In fact by those processes the raw material is carbonized a good deal and is therefore useless for any further purpose, except as a lean fuel. Moreover, conventional processes, even with most modern plants, have the disadvantage of giving furfural yields which are very low and attain only 50% of the theoretical value.

On the other hand, there are also known processes for extracting cellulose from agricultural cellulosic water such as wheat or rye straw, husks and stalks of maize, sugar cane bagasse etc. Mostly, those processes are based upon the alkaline digestion of the raw material. They have solely the object of obtaining a cellulose that is suited for further treatment in the paper-making industry. Hence the possibility of obtaining also other products at the same time, such as for instance furfural, is not even contemplated, or if it is taken into consideration, furfural represents a secondary product and, consequently, there are no means contrived to get a furfural yield somewhat more than mediocre.

The present invention relates to a process in two stages, in which cellulosic agricultural wastes such as wheat straw, rye straw, or rice straw, maize husks or stalks, eucalyptus twigs, sugar cane bagasse etc. are treated with volatile acids by effecting a mild pre-hydrolysis of the cellulosic materials, in such a manner as to preserve the integrity of the cellulose, extracting the pentosanes to be converted into furfural. In that way with only one charge of raw material and with operation in two steps there are obtained the cellulose as well as the furfural with very high yields. Moreover the process enables to graduate accurately the treatment in such a way as to purify the cellulose almost to 100% or to leave therein a greater or minor amount of pre-hydrolyzable substances.

The process can be carried out in various ways. With one of those ways for instance the raw material such as straw of wheat, rye or rice, maize husks or stalks, sugar cane bagasse etc., is conveniently prepared by comminuting it to make it more permeable to the reactants. After maceration (which may even be dispensed with), the raw material is passed over to an apparatus wherein it is conveniently acidified by impregnating it for instance by spraying with a solution of sulfur dioxide by means of nebulization or by means of direct contact with sulfur dioxide in gaseous state or dissolved in water and is then immersed into autoclaves, preferably of static type with double internal wall. In those autoclaves the raw material is first hydrolized at temperatures up to 110° C. for a duration of time variable from 1 to 5 hours according to the physical state and to the quality of the raw material employed. In that way the pentosanes contained in the raw material are transformed into pentoses and pass into solution together with the other sugars. The pentosic liquid is then transformed by means of heating up to 185° C. into furfuralic liquid from which by means of normal distillation furfural is obtained. Said sugar liquids may also be converted alternatively into furfural in a continuous converter at temperatures up to 185° C. or even they may be subjected to a process of special seeding (for instance with torules) to obtain fodder therefrom or even to transform them into alcohol, as may be more convenient. The residue of the hydrolysis, liberated from the pentosanes and from the hemi-celluloses for conversion thereof into sugars, is constituted by cellulosic fibers which have kept unaltered structure and form a semi-chemical paste or "pulp" which can be transformed into wrapping paper or paperboard without any chemical treatment, but only by hydromechanical work.

This process of ours which can be usefully applied to any cellulosic agricultural waste, is particularly advantageous for the treating of sugar cane bagasse. It is known in fact that bagasse is widely employed for the manufacturing of paper, but the high "pith" content prejudices strongly the quality of the paper and, therefore, must be eliminated previously. Heretofore mechanical means have been applied which even if highly improved have the disadvantage of not being able to remove completely the pith and of destroying during treatment also a part of the cellulose. Instead with our process not only one extracts completely the pith, thereby preparing the bagasse for the subsequent paper-making treatment, but one also obtains pentosic-hexosic liquids to be utilized either for furfural or for fodder, alcohol etc.

An example of process described by way of indication and without limitation is as follows:

Example I 100 kg. of straw are comminuted and macerated or not, according to need. Thereafter they are permeated with a solution of sulfur dioxide in 5 per mille concentration and autoclaved with 1000 litres of said aqueous solution for about 5 hours at 110° C. The pentosic liquids so obtained with nearly theoretical yield with respect to pentosanes, are added with 3% of sulfuric acid and with 0.3% of zinc chloride and are passed through a continuous converter at 185° C. and for 15 minutes of contact, thereby obtaining a furfuralic liquid with a furfural yield of 8%, with respect to the straw, which had 10%, such yield being higher than obtainable by any direct method. The solid residue of the preliminary hydrolysis is mainly composed of cellulose and after washing with water and drying, it can be used direct for paper and paperboard, or further purified for fine paper pulp.

Example II 100 kg. of maize husks conveniently comminuted and acidified with a solution of formic acid of 1% concentration, are digested in an autoclave with 1500 litres of said solution for 4 hours at 115° C. The pentosic liquid so obtained, after addition thereto of 4% of sulfuric acid and of 0.25% of commercial aluminium chloride, passes to the continuous converter. Conversion is effected at 185° C. for 20 minutes' contact in uninterrupted flow and then the whole is passed over to the rectifying column. A furfural yield is obtained of 7% with respect to the theoretical yield of the product, which is 8%. The solid residue of the pre-hydrolysis is employed as in Example I.

Example III 100 kg. of sugar cane bagasse are acidified with a solution of sulfur dioxide of 4 per mille concentration and are then autoclaved with 600 kg. of said solution for 5 hours at the temperature of 120° C. with forced liquid circulation. Finally, a pentosic liquid is obtained which, if 3% of concentrated sulfuric acid and 0.30% of commercial aluminium chloride are added, is passed over to the continuous converter. Conversion is carried out for 15 or 20 minutes contact in continuous flow at the temperature of 185° C. and then the whole is passed over to the rectifying column. A furfural yield of 12% is so obtained. The solid residue of prehydrolysis serves for paper making and paperboard for wrapping or after refining for the manufacture of fine paper.

I claim:

In a two-stage process for recovering cellulose and furfural from pentosan-containing vegetable materials by subjecting said vegetable materials to a preliminary hydrolysis in a slightly acidic environment, recovering the cellulose and subjecting the resultant pentose-containing liquid phase to heating with an acid to obtain furfural therefrom, the steps of (a) effecting said preliminary hydrolysis at a temperature of not less than 100° C. within an aqueous medium with a gaseous reducing compound selected from the group consisting of sulphur dioxide and formic acid, and (b) carrying out the conversion into furfural of the pentoses present in said pentose-containing liquid phase in the presence of a ring-closing agent selected from the group consisting of the chlorides of aluminum and zinc, at a temperature not higher than 185° C. and in a proportion of 0.3% by weight of said liquid phase.

References Cited in the file of this patent

UNITED STATES PATENTS

| | | |
|---|---|---|
| 1,364,418 | Weiss | Jan. 4, 1921 |
| 1,581,671 | Bradley | Apr. 20, 1926 |
| 1,838,109 | Richter | Dec. 29, 1931 |
| 2,559,607 | Dunning | July 10, 1951 |
| 2,615,883 | Sweeney | Oct. 28, 1952 |

OTHER REFERENCES

Wise: Minor By-Products of the Pulp Industry From The Paper Industry and Paper World for March 1943, pages 1223, 1225, 1226, 1227.

Wood Chemistry, Wise and Jahn, 2nd Ed. vol. 2, pub. by Reinhold, New York, N.Y., 1952, pages 1162–1170.